US009979010B2

(12) United States Patent
Hashimoto

(10) Patent No.: US 9,979,010 B2
(45) Date of Patent: *May 22, 2018

(54) ELECTRODE FOR ELECTRICAL STORAGE ELEMENT, AND NONAQUEOUS LITHIUM ELECTRICAL STORAGE ELEMENT

(71) Applicant: Asahi Kasei Kabushiki Kaisha, Tokyo (JP)

(72) Inventor: Tomotaka Hashimoto, Tokyo (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 167 days.

This patent is subject to a terminal disclaimer.

(21) Appl. No.: 14/432,632

(22) PCT Filed: Sep. 30, 2013

(86) PCT No.: PCT/JP2013/076605
§ 371 (c)(1),
(2) Date: Mar. 31, 2015

(87) PCT Pub. No.: WO2014/054599
PCT Pub. Date: Apr. 10, 2014

(65) Prior Publication Data
US 2015/0255781 A1     Sep. 10, 2015

(30) Foreign Application Priority Data

Oct. 1, 2012   (JP) .................. 2012-219585

(51) Int. Cl.
| H01M 4/133 | (2010.01) |
| H01M 10/0525 | (2010.01) |
| H01G 11/24 | (2013.01) |
| H01G 11/32 | (2013.01) |
| H01M 4/13 | (2010.01) |
| H01M 4/587 | (2010.01) |
| H01M 10/052 | (2010.01) |
| H01G 11/50 | (2013.01) |
| H01G 11/06 | (2013.01) |
| H01M 10/056 | (2010.01) |
| H01M 12/00 | (2006.01) |
| H01M 4/02 | (2006.01) |

(52) U.S. Cl.
CPC .............. *H01M 4/13* (2013.01); *H01G 11/06* (2013.01); *H01G 11/24* (2013.01); *H01G 11/32* (2013.01); *H01G 11/50* (2013.01); *H01M 4/133* (2013.01); *H01M 4/587* (2013.01); *H01M 10/052* (2013.01); *H01M 10/056* (2013.01); *H01M 10/0525* (2013.01); *H01M 12/005* (2013.01); *H01M 2004/021* (2013.01); *H01M 2004/028* (2013.01); *H01M 2220/20* (2013.01); *Y02E 60/122* (2013.01); *Y02E 60/13* (2013.01); *Y02T 10/7011* (2013.01); *Y02T 10/7022* (2013.01)

(58) Field of Classification Search
CPC .......... H01M 4/583; H01M 4/96; H01M 4/13; H01M 4/133; H01M 4/587; H01M 10/0525; H01G 11/06; H01G 11/24; H01G 11/32; H01G 11/50
See application file for complete search history.

(56) References Cited

U.S. PATENT DOCUMENTS

| 9,748,045 | B2* | 8/2017 | Okada ................... H01G 11/06 |
| 2007/0010666 | A1 | 1/2007 | Tajiri et al. |
| 2009/0310282 | A1* | 12/2009 | Aida ..................... H01G 11/06 361/504 |
| 2010/0255377 | A1 | 10/2010 | Tsubata et al. |
| 2010/0276631 | A1* | 11/2010 | Mabuchi ............... H01M 4/133 252/182.1 |
| 2013/0202962 | A1 | 8/2013 | Sakai et al. |
| 2015/0311002 | A1* | 10/2015 | Okada ................... H01G 11/06 429/163 |
| 2015/0371788 | A1* | 12/2015 | Okada ................... H01G 11/24 361/502 |

FOREIGN PATENT DOCUMENTS

| EP | 1715496 A1 | 10/2006 |
| JP | 2004-221523 A | 8/2004 |
| JP | 2005-093778 A | 4/2005 |
| JP | 2006-179558 A | 7/2006 |

(Continued)

OTHER PUBLICATIONS

Machine translation of JP 2010-267878, published on Nov. 25, 2010.*
Morimoto, "Development and Industrialization of electric double-layer capacitors," TANSO, 202-209 (2004) (see English abstract).
International Search Report and Written Opinion issued in corresponding International Patent Application No. PCT/JP2013/076605 dated Dec. 24, 2013.
Supplementary European Search Report issued in corresponding European Patent Application No. 13843320.6 dated Sep. 9, 2015.
Office Action issued in corresponding European Patent Application No. 13843320.6 dated Sep. 21, 2015.
Xu et al., "Highly mesoporous and high surface area carbon: A high capacitance electrode material for EDLCs with various electrolytes," Electrochemistry Communications, 10: 795-797 (2008).

(Continued)

*Primary Examiner* — Anca Eoff
(74) *Attorney, Agent, or Firm* — Morgan, Lewis & Bockius LLP

(57) ABSTRACT

Provided is a non-aqueous lithium-type electrical storage element having both high output and high capacity per volume. The non-aqueous lithium-type electrical storage element relevant to the present invention is a non-aqueous lithium-type electrical storage element having: an electrode body laminated with a positive electrode having a positive electrode active material layer including a positive electrode active material, and a positive electrode current collector, a separator, and a negative electrode having a negative electrode active material layer including a negative electrode active material, and a negative electrode current collector; a non-aqueous electrolytic solution including a lithium ion; and an outer casing.

6 Claims, 1 Drawing Sheet

(56) References Cited

FOREIGN PATENT DOCUMENTS

| | | | |
|---|---|---|---|
| JP | 2007-266248 A | | 10/2007 |
| JP | 2010-205827 A | | 9/2010 |
| JP | 2010-267878 | * | 11/2010 |
| JP | 2010-267878 A | | 11/2010 |
| WO | 2005/019105 A1 | | 3/2005 |
| WO | 2009/063966 A1 | | 5/2009 |
| WO | 2012/050104 A1 | | 4/2012 |

OTHER PUBLICATIONS

Feng et al., "Highly mesoporous carbonaceous material of activated carbon beads for electric double layer capacitor," Electrochimica Acta, 55: 7334-7340 (2010).

Office Action issued in corresponding European Patent Application No. 13843320.6 dated Mar. 28, 2017.

* cited by examiner (a)

(b)

ELECTRODE FOR ELECTRICAL STORAGE ELEMENT, AND NONAQUEOUS LITHIUM ELECTRICAL STORAGE ELEMENT

TECHNICAL FIELD

The present invention relates to an electrical storage element using a non-aqueous electrolytic solution containing a lithium salt as an electrolyte.

BACKGROUND ART

Recently, from the viewpoint of effective utilization of energy aimed at global environmental conservation and effective utilization of resources, a nighttime power storage system, a home-use distributed electrical storage system based on photovoltaic power generation technology, and an electrical storage system for an electric vehicle, have attracted attention.

The first requirement for the electrical storage elements used in these electrical storage systems is that energy density is high. As the electrical storage element having a high degree of energy density and capable of meeting other storage requirements, lithium ion batteries have been actively sought.

The second requirement is the capacity for high output. For example, in a combination of a highly efficient engine and an electrical storage system (for example, a hybrid electric vehicle), or in a combination of a fuel cell and an electrical storage system (for example, a fuel-cell electric vehicle), high output discharge characteristics are required from the electrical storage system, in order to achieve sufficient acceleration. As one type of a high output electrical storage element capable of corresponding to such requirements, electric double layer capacitors (hereafter, it may simply be referred to also as "capacitor") using activated carbon as an electrode, have been developed.

The electric double layer capacitors exhibit high durability (cycle characteristics and high temperature storage characteristics), and output characteristics of about 0.5 to 1 KW/L. These electric double layer capacitors are considered to be the optimum electrical storage element in fields where the above-described high output is required; however, the energy density thereof is only about 1 to 5 Wh/L, and output duration time limit their use in practical applications.

As with lithium ion batteries, research continues toward realizing higher output. For example, a lithium ion battery has been developed that is capable of providing a high output of over 3 kW/L, at a depth of discharge (a value indicating a state of charge in terms of percentage) of 50%; however, a lithium ion battery has been actually designed to suppress energy density equal to or less than 100 Wh/L, even though a lithium ion battery is identically characterized by the highest energy density (higher than 100 Wh/L). Durability thereof (cycle characteristics and high temperature storage characteristics) are inferior to that of the electric double layer capacitors. Therefore, in order to have practical durability, the lithium ion battery is usable only in a depth of discharge that is a narrower range than between 0 to 100%. Therefore, usable capacity in practice is reduced, and further research is being carried out to enhance durability.

Although practical application of the electrical storage element having high output, high energy density and durability, as described above, has been required, the lithium ion battery and the electric double layer capacitors have advantage and disadvantage. Accordingly, as an electrical storage element satisfying these technological requirements, development of a lithium ion capacitor has been active.

The lithium ion capacitor is the electrical storage element (non-aqueous lithium-type electrical storage elements) using a non-aqueous electrolytic solution including a lithium salt as an electrolyte, and is the electrical storage element carrying out charge-discharge by a non-faradaic reaction based on adsorption/desorption of a negative ion similar to that in the electric double layer capacitor, in a positive electrode at a voltage of about 3 V or higher, and by a faradaic reaction based on intercalation/deintercalation of a lithium ion similar to that in the lithium ion battery, in a negative electrode.

As described above, in the electric double layer capacitors that carry out charge-discharge by an non-Faradaic reaction in both of the positive electrode/the negative electrode, input-output characteristics is superior (this means that a large current can be charged and discharged in a short period of time), but energy density is low. On the other hand, in a secondary battery that carries out charge-discharge by the faradaic reaction in both the positive electrode/the negative electrode, energy density is superior, but input-output characteristics are inferior. A lithium ion capacitor is an electrical storage element which can achieve both superior input-output characteristics and high energy density, by carrying out charge-discharge based on the non-faradaic reaction in the positive electrode and based on the faradaic reaction in the negative electrode.

As for the lithium ion capacitor, there has been proposed an electrical storage element using an activated carbon as a positive electrode active material, and using natural graphite or artificial graphite, graphitized meso-phase carbon microsphere, graphitized meso-phase carbon fiber, graphite whisker, graphitized carbon fiber or hard carbon, as a negative electrode active material. As the above-described activated carbon, an activated carbon, which had been proposed in the electric double layer capacitor, has been used in the beginning (for example, refer to the NON-PATENT LITERATURE 1 below).

However, between the positive electrode of the lithium ion capacitor and the positive and negative electrodes of the electric double layer capacitor, there is a difference in that a cation in the non-aqueous electrolytic solution is a lithium ion in the former and a quaternary ammonium ion in the latter. Accordingly, attempts have been to find a material that can be used as the positive electrode active material of the lithium ion capacitor, but not divert the activated carbon for the electric double layer capacitor.

For example, there has been proposed an electrical storage element using a hydrocarbon material in which a hydrogen/carbon ratio (atomic ratio) is 0.05 to 0.5, a BET specific surface area is 300 to 2000 m$^2$/g, and having a pore structure of a mesopore volume by the BJH method is 0.02 to 0.3 ml/g, and a total pore volume by the MP method is 0.3 to 1.0 ml/g, for a positive electrode, and using a material where an optically anisotropic carbon material is activation treated, excluding a graphite, for a negative electrode (refer to the PATENT LITERATURE).

There has been proposed a non-aqueous lithium-type electrical storage element using an activated carbon, satisfying $0.3 \leq V1 \leq 0.8$ and $0.5 \leq V2 \leq 1.0$, provided that mesopore volume derived from a pore having a diameter of 20 Å to 500 Å is V1 (cc/g), and micro-pore volume derived from a pore having a diameter of smaller than 20 Å is V2 (cc/g), and a BET specific surface area of 1500 m$^2$/g to 3000 m$^2$/g, for a positive electrode, and using a carbon material satisfying $0.01 \leq Vm1 \leq 0.20$ and $0.01 \leq Vm2 \leq 0.40$, provided that mesopore volume derived from a pore having a diameter of 20 Å to 500 Å is Vm1 (cc/g), and micro-pore volume derived from a pore having a diameter of smaller than 20 Å is Vm2 (cc/g), for the negative electrode (refer to the PATENT LITERATURE 2).

CITATION LIST

Patent Literature

PATENT LITERATURE 1: JP-A-2005-93778
PATENT LITERATURE 2: WO2009/063966

Non-Patent Literature

NON-PATENT LITERATURE 1: Present state of development and industrialization of electric double layer capacitors, Tsuyoshi Morimoto, "Carbon", 2004 (No. 214), pages 202 to 209

SUMMARY OF INVENTION

Technical Problem

As described above, although various non-aqueous lithium-type electrical storage elements have been proposed, there is still a requirement for a non-aqueous lithium-type electrical storage element having both higher output and high capacity per volume. Accordingly, a problem to be solved by the present invention is to provide the non-aqueous lithium-type electrical storage element having both further higher output and high capacity per volume.

Solution to Problem

Capacity $C_1$ per weight stored in the electrode active material layer of an electrode of an electrical storage element is expressed by the following formula (1):

$$C_1 \, [F/g] = (\epsilon_0 \epsilon_r / \delta) \, [F/m^2] \times S \, [m^2/g] \quad \text{Formula (1)}$$

{wherein S represents specific surface area of an active material included in an electrode active material layer; δ represents thickness of a double layer formed between the active material surface and a charge carrier; $\epsilon_0$ represents vacuum dielectric constant; and $\epsilon_r$ represents relative dielectric constant of the double layer.}

For example, in the case of the lithium ion capacitor, $(\epsilon_0 \epsilon_r / \delta)$ of an the activated carbon is generally about 0.06 to 0.08 F/m², therefore, the capacity $C_1$ per weight is 150 F/g or more, in the activated carbon having a specific surface area S of 2,500 m²/g or more. In this way, it is expected that with the increase in the specific surface area S, capacity $C_1$ per weight also increases.

On the other hand, capacity $C_2$ per volume of the active material layer of the electrode is expressed by the following formula (2):

$$C_2 \, [F/cm^3] = C_1 \, [F/g] \times \sigma \, [g/cm^3] \quad \text{Formula (2)}$$

{wherein $C_1$ represents capacity per weight to be stored in the active material layer of the electrode of the electrical storage element electrode; and σ represents bulk density of the active material layer of the electrode.}

Accordingly, by using an active material having high specific surface area S, capacity $C_1$ per weight can be increased, and capacity $C_2$ per volume of the active material layer of the electrode can be enhanced, and/or by increasing bulk density σ of the active material layer of the electrode, capacity $C_2$ per volume of the active material layer of the electrode can be enhanced. However, generally, when an active material having high specific surface area S is used, bulk density σ of the active material layer tends to decrease, and it is necessary to select the active material in consideration of this balance.

The present inventors have intensively studied how to solve the above-described problems and, as a result of repeating experiments, found that, by using an activated carbon having pore size distribution different from that of the activated carbon described in the PATENT LITERATURE 1 and 2, as a positive electrode active material, an active material layer having high specific surface area and high bulk density can be prepared. The present inventors have also found that the non-aqueous lithium-type electrical storage element using such an active material layer can solve the above-described problems and have thus completed the present invention.

That is, the present invention is the non-aqueous lithium-type electrical storage element as described below.

[1] A non-aqueous lithium-type electrical storage element, having: an electrode body laminated with a positive electrode having a positive electrode active material layer including a positive electrode active material, and a positive electrode current collector, a separator, and a negative electrode having a negative electrode active material layer including a negative electrode active material, and a negative electrode current collector, a non-aqueous electrolytic solution including a lithium ion; and an outer casing; wherein the positive electrode active material comprises an active material having a BET specific surface area of 2600 m²/g to 4500 m²/g, and having an average particle size of 1 μm to 30 μm, in which mesopore volume V1 (cc/g) derived from a pore having a diameter of 20 Å to 500 Å, calculated by the BJH method, is 0.8<V1≤2.5, and micro-pore volume V2 (cc/g) derived from a pore having a diameter of smaller than 20 Å, calculated by the MP method, is 0.92<V2≤3.0; and the positive electrode active material layer has a bulk density of 0.40 g/cm³ to 0.70 g/cm³.

[2] The non-aqueous lithium-type electrical storage element according to the above-described [1], wherein the positive electrode active material is an activated carbon having a BET specific surface area of 3000 m²/g to 4000 m²/g.

[3] The non-aqueous lithium-type electrical storage element according to the above-described [1] or [2], wherein the negative electrode active material comprises a composite porous material, in which mesopore volume Vm1 (cc/g) derived from a pore having a diameter of 20 Å to 500 Å calculated by the BJH method, is 0.01≤Vm1≤0.20, and micro-pore volume Vm2 (cc/g) derived from a pore of smaller than a diameter 20 Å calculated by the MP method, is 0.01≤Vm2≤0.40.

[4] The non-aqueous lithium-type electrical storage element according to the above-described [1] or [2], wherein the negative electrode active material comprises a hard carbon material, in which mesopore volume Vm1 (cc/g) derived from a pore having a diameter of 20 Å to 500 Å calculated by the BJH method, is 0.001≤Vm1≤0.01, and micro-pore volume Vm2 (cc/g) derived from a pore having a diameter of smaller than 20 Å calculated by the MP method, is 0.001≤Vm2≤0.01.

[5] A non-aqueous lithium-type electrical storage element according to any one of the above-described [1] to [4], wherein the product of capacity per weight of the positive electrode active material layer, and ratio of discharge capacity under high current condition to discharge capacity under low current condition, is 115 or more.

[6] An electrode for an electrical storage element, which comprises an active material, having a BET specific surface area of 2600 m$^2$/g to 4500 m$^2$/g, and having an average particle size of 1 μm to 30 μm, in which mesopore volume V1 (cc/g) derived from a pore having a diameter of 20 Å to 500 Å, calculated by the BJH method, is 0.8<V1≤2.5, and micro-pore volume V2 (cc/g) derived from a pore having a diameter of smaller than 20 Å, calculated by the MP method, is 0.92<V2≤3.0; and wherein bulk density of an active material layer, which comprises the active material, is 0.40 g/cm$^3$ to 0.70 g/cm$^3$.

Advantageous Effects of Invention

The non-aqueous lithium-type electrical storage element of the present invention provides both high capacity per volume and high output.

DESCRIPTION OF EMBODIMENTS

Figure 1:
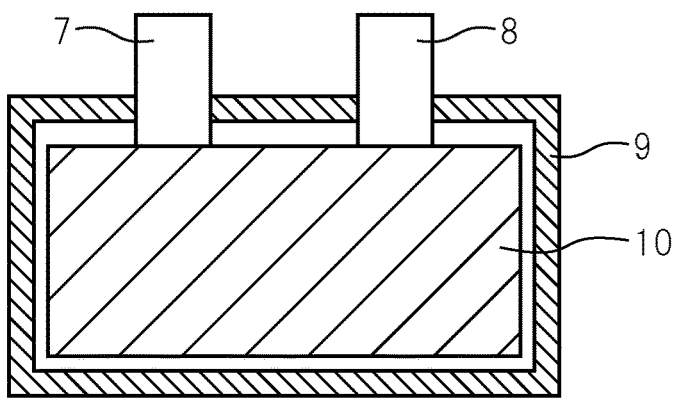
FIG. 1 (a) is a schematic cross-section drawing of a plane direction showing one aspect of an electrical storage element of the present invention. (b) is a schematic cross-section drawing of a thickness direction, showing one aspect of an electrical storage element of the present invention.
Figure 1:
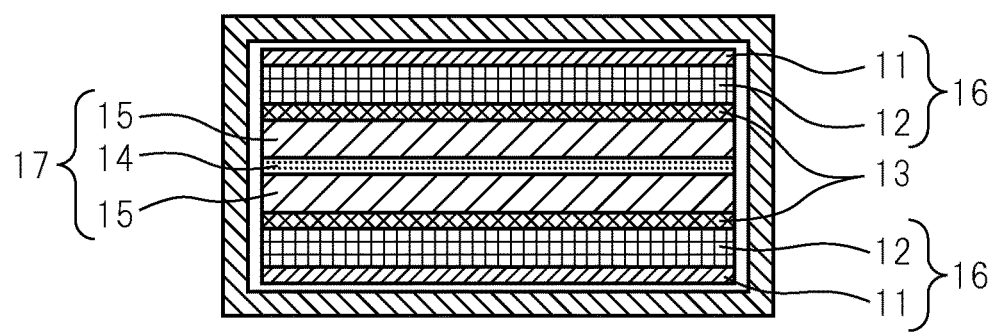

The non-aqueous lithium-type electrical storage element of the present embodiment is composed of an electrode body; laminated with a positive electrode having a positive electrode active material layer including a positive electrode active material and a positive electrode current collector, a separator, and a negative electrode having a negative electrode active material layer including a negative electrode active material, and a negative electrode current collector, a non-aqueous electrolytic solution containing a lithium ion; and an outer casing. Explanation will be given below on a preferable embodiment of the non-aqueous lithium-type electrical storage element of the present invention.
(The Positive Electrode Active Material)

The positive electrode active material includes an activated carbon which satisfies 0.8<V1≤2.5 and 0.92<V2≤3.0, provided that mesopore volume derived from a pore having a diameter of 20 Å to 500 Å, calculated by the BJH method, is V1 (cc/g), and micro-pore volume derived from a pore having a diameter of smaller than 20 Å, calculated by the MP method, is V2 (cc/g).

The mesopore volume V1 is preferably a value higher than 0.8 cc/g, from the viewpoint of increasing output characteristics, when a positive electrode material is incorporated in the electrical storage element, as well as preferably 2.5 cc/g or less, from the viewpoint of suppressing decrease in capacity of the electrical storage element. The V1 is more preferably 1.00 cc/g to 2.0 cc/g, and still more preferably 1.2 cc/g to 1.8 cc/g.

On the other hand, the micro-pore volume V2 is preferably higher than 0.92 cc/g in order to make a specific surface area of the activated carbon larger, as well as to increase capacity, and preferably 3.0 cc/g or less, in the view point of increasing density of the activated carbon as an electrode, and increasing capacity per unit volume. The V2 is more preferably higher than 1.0 cc/g and 2.5 cc/g or less, and still more preferably 1.5 cc/g to 2.5 cc/g.

The above-described micro-pore volume and the mesopore volume are values determined by the following methods. That is, a sample is dried under vacuum at 500° C. for 24 hours to carry out measurement of an isotherm of absorption and desorption, using nitrogen as an adsorbent. Using the isotherm of the desorption in this case, the micro-pore volume and the mesopore volume are calculated by the MP method and the BJH method, respectively.

The MP method means a method for determining micro-pore volume, micro-pore area and micro-pore distribution, by utilization of "a t-plot method" (B. C. Lippens, J. H. de Boer, J. Catalysis, 4319 (1965)), which is a method devised by M. Mikhail, Brunauer, and Bodor (R. S. Mikhail, S. Brunauer, E. E. Bodor, J. Colloid Interface Sci., 26, 45 (1968)). The BJH method is a calculation method to be used generally in analysis of the mesopore, which was proposed by Barrett, Joyner, Halenda et. al. (E. P. Barrett, L. G. Joyner and P. Halenda, J. Amer. Chem. Soc., 73, 373(1951)).

The activated carbon having the above-described mesopore volume and the micro-pore volume has higher BET specific surface area as compared with the activated carbon which has used for a conventional electric double layer capacitor or lithium ion capacitor. Specific value of the BET specific surface area is 2600 m$^2$/g to 4500 m$^2$/g, and preferably 3000 m$^2$/g to 4000 m$^2$/g. In the case where the BET specific surface area is 2600 m$^2$/g or more, good energy density is obtained easily, on the other hand, in the case where the BET specific surface area is 4500 m$^2$/g or less, performance per electrode volume tends to be enhanced, because of no necessity of charging a large quantity of a binder to keep strength of the electrode.

The activated carbon having the above-described characteristics can be obtained by using raw materials and a processing method which, for example, are explained below.

Carbonaceous materials to be used as the raw materials of the activated carbon are not especially limited as long as they are carbon source to be used as normally an activated carbon raw material, and include, for example, plant-based raw materials such as wood, wood flour, coconut shell; fossil-based raw materials such as petroleum pitch, coke; various synthetic resins such as phenolic resin, furan resin, vinyl chloride resin, vinyl acetate resin, melamine resin, urea resin, resorcinol resin. Among these raw materials, phenolic resin and furan resin are particularly preferable because they are suitable for preparing an activated carbon having high specific surface area.

As carbonizing method of these raw materials, or heating method in activation treatment, there is included, for example, a known method such as a fixed-bed method, a moving bed method, a fluidized bed method, a slurry method, a rotary kiln method. As atmosphere in heating, inert gas such as nitrogen, carbon dioxide, helium, argon, or mixed gas with other gas using these inert gases as main components is used. It is a general method for calcination under a carbonization temperature at about 400 to 700° C., for about 0.5 to about 10 hours.
[Pulverizing/Classification Step]

In the present invention, it is important that the above-described carbonaceous material (carbonized product) is pulverized and classified in advance before activation. This is because activation can be carried out efficiently, as well as characteristics decrease by newly generated interface, in the case where pulverizing is carried out after activation, can be prevented.

Explanation will be given below on a method for pulverizing the carbonaceous material in advance.

The pulverizing method may be any of dry-type pulverizing and wet-type pulverizing, however, the wet-type pulverizing is preferable, from the viewpoint of pulverizing speed, continuous operability or power consumption amount. In the case of the wet-type pulverizing, the following conditions can be employed specifically. Firstly, pulverizing is carried out by putting a sample to be pulverized, hard beads of such as metal, zirconia or ceramics, and a solvent into a hard container of a metal, agate or ceramics. As for the container, one which can be sealed is preferable, and it is preferable to replace the inside of container with an inert gas such as nitrogen or argon, when pulverizing. As for the solvent, water or an organic solvent can be used; however, an organic solvent having low boiling point is not suitable, due to having risk of ignition. Pulverizing time is adjusted by particle size of the obtained sample; however, pulverizing for a long time could result in contamination of impurities. Because particle size distribution is widened by pulverizing, it is preferable to carry out classification using a sieve. As a result of classification, in the present invention, classification between 1 μm and 30 μm can be carried out. The carbonaceous material obtained by the above-described pulverizing and classification step, is carbonized by the following method to obtain a carbonized product.

As for the activation method for the carbonized product after the pulverizing the classification, there are a gas activation method for carrying out calcination using activation gas of steam, carbon dioxide or oxygen, and an alkali metal activation method for carrying out heat treatment after mixing with an alkali metal compound; however, the alkali metal activation method is preferable to prepare an activated carbon having high specific surface area. In this activation method, after mixing the carbonized product and the alkali metal compound such as KOH, NaOH, so as to attain a weight ratio of 1:1 or more, heating is carried out under inert gas atmosphere in a temperature range of 600 to 900° C., for 0.5 to 5 hours, and then the alkali metal compound is removed by washing with an acid and water, and still more drying is carried out.

In the present invention, weight ratio of the carbonized product and the alkali metal compound(=carbonized product:alkali metal compound) is 1:1 or more, and with increase in the alkali metal compound, mesopore volume increases; however, at boundary of weight ratio of about 1:3.5, the pore volume tends to increase abruptly, therefore the more alkali metal compound than the weight ratio of 1:3 or more, is preferable, and 1:5.5 or less is preferable. As for the weight ratio, with the increase in alkali metal compound, pore volume increases; however, in consideration of treating efficiency of subsequent washing, it is preferable to be the above-described range.

In order to increase micro-pore volume and not to increase mesopore volume, a little more amount of the carbonized product is mixed with KOH in activation. In order to increase both of the pore volumes, more KOH is mixed in the ratio of the carbonized product and KOH. In order to mainly increase mesopore volume, steam activation is carried out after the alkali activation treatment.

As described above, it is desired that the non-aqueous lithium-type electrical storage element has high energy density as well as high output density (discharge rate). The activated carbon to be used in the non-aqueous lithium-type electrical storage element of the present invention has such characteristics as (i) because capacity (F/g) per weight of the positive electrode active material is high, capacity (F/g) per weight of the positive electrode active material layer is high, as well as (ii) ratio of discharge capacity under high current condition to discharge capacity under low current condition is large, and it is desirable that the product of (i) and (ii) is 115 or more, as the non-aqueous lithium-type electrical storage element. The product is more preferably 120 or more, and still more preferably 135 or more.

In the present description, the term "discharge capacity under low current condition" is defined as capacity for discharging within a range of 1 to 2 C. In this case, 1 C is defined as current when discharge is completed in carrying out constant current discharge for 1 hour. The term "high current condition" is defined as current for discharging under a current of 100 times of "low current condition".

Average particle size of the activated carbon to be used in the non-aqueous lithium-type electrical storage element of the present invention is 1 μm to 30 μm, preferably 2 μm to 20 μm, and more preferably 2 μm to 7 μm. It may be a mixture of two kinds of the activated carbons having different average particle size. In this case, the average particle size indicates 50% diameter (Median diameter), provided that, when determining the accumulated curve assuming the total volume as 100% in measurement of particle size distribution using a particle size distribution measuring device, the particle size of the point, in which an accumulated curve thereof is 50%, is assumed as 50% diameter.

In the case where a material (for example, an activated carbon not having the above-described specific V1 and V2, or a composite oxide of lithium and a transition metal) other than the activated carbon having the above-described specific V1 and V2 is contained in the positive electrode active material, content of the activated carbon having the above-described specific V1 and V2 should be higher than 50% by weight of total positive electrode active material. Content of the activated carbon having the above-described specific V1 and V2 in the total positive electrode active material is more preferably 70% by weight or more, still more preferably 90% by weight or more, and most preferably 100% by weight.

(Positive Electrode)

The positive electrode may be the one formed with the positive electrode active material layer only on one side of the positive electrode current collector, or may be the one formed with it on both sides. Thickness of the positive electrode active material layer is, preferably, for example, 30 μm to 200 μm per one side.

A material of the positive electrode current collector is not particularly limited, as long as it is an electric conductive material not causing elution into the electrolytic solution or deterioration of reaction, in making the electrical storage element. As a suitable material, aluminum is included. As shape of the positive electrode current collector, such a structure (for example foam) that an electrode can be formed at a gap of a metal foil or a metal, can be used. The metal foil may be a usual metal foil not having a through hole, or may be a metal foil having a through hole of an expanded metal or punching metal. Thickness of the positive electrode current collector is not especially limited, as long as shape and strength of the electrode can be held sufficiently; however, it is preferably, for example, 1 to 100 μm, from the viewpoint of strength, conductive resistance, and capacity per volume.

A binder to be used in the positive electrode active material layer is not especially limited; however, PVdF (polyvinylidene fluoride), PTFE (polytetrafluoroethylene), or a styrene-butadiene copolymer can be used. Content of the binder in the positive electrode active material layer is preferably, for example, in a range of 3 to 20% by weight relative to 100 parts by weight of the positive electrode active material. Electric conductive filler can be mixed into the positive electrode active material layer, as needed. The type of electric conductive filler is not particularly limited; however, acetylene black, Ketjen black, vapor grown carbon fiber are exemplified. Addition amount of the electric conductive filler is preferably, for example, 0 to 30% by weight, relative to 100 parts by weight of the active material.

The positive electrode can be manufactured by utilization of a known electrode formation method in the lithium ion battery or the electric double layer capacitor, and it can be obtained, for example, by carrying out a coating step for coating the slurry dispersed the positive electrode active material, electric conductive filler, a binder into a solvent, onto the positive electrode current collector as the positive electrode active material layer; a drying step for drying the solvent; and a pressurizing step for enhancing bulk density of the positive electrode active material layer by pressurization.

The bulk density of the positive electrode active material layer is 0.40 g/cm$^3$ or more, and preferably in a range of 0.45 g/cm$^3$ to 0.70 g/cm$^3$. When the bulk density is 0.40 g/cm$^3$ or more, electrode capacity per volume can be increased, and small sizing of the electrical storage element can be attained. When the bulk density is 0.70 g/cm$^3$ or less, it is considered that diffusion of the electrolytic solution in voids in the positive electrode active material layer is sufficient, and charge-discharge characteristics under large current is high.

The bulk density of the positive electrode active material layer to be used in one embodiment of the present invention is smaller than bulk density of an active material layer of a usual activated carbon prepared by the same method, caused by having specific micro-pore volume and mesopore volume. In that case, in order to attain the abode-described bulk density in a state formed as the positive electrode active material layer, for example, a pressurization method under heating (hereafter, it may also be referred to as "heating press"), using a roll, in which the surface temperature is set at a temperature of the melting point minus 40° C. or higher of the above-described binder, and at a temperature of the melting point or lower, can be used.

It may be carried out by a forming step for mixing the activated carbon and the binder in a dry system without using a solvent, and forming them to a plate-shape by pressurizing them in a heated state at a temperature of the melting point minus 40° C. or higher of the above-described binder, and at a temperature of the melting point or lower; and a bonding step for attaching the positive electrode active material layer formed to the positive electrode current collector using electric conductive adhesives. The melting point can be determined by an endothermic peak position in differential scanning calorimetry (DSC). For example, the melting point is the endothermic peak temperature in a temperature increasing process, which is obtained by setting 10 mg of a sample resin at a measurement cell, using a differential scanning calorimeter, "DSC7", manufactured by Perkin Elmer Corp., and increasing the temperature from 30° C. up to 250° C. in a temperature increasing rate of 10° C./min, under a nitrogen gas atmosphere.

The heating press method can be carried out, for example, by the following step. Explanation will be given on equipment to be used in heating press with reference to FIG. 2.

Figure 2:
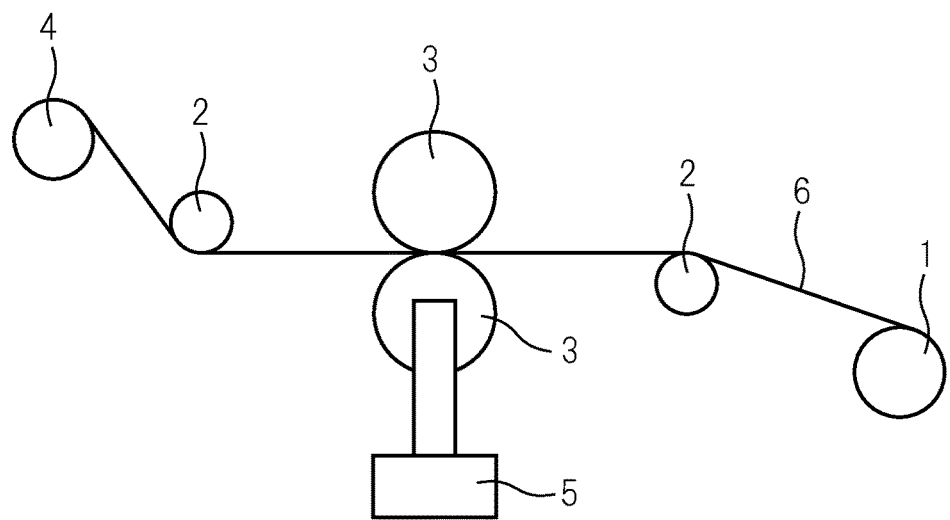
FIG. 2 is a schematic drawing of one example of an apparatus to be used in a pressurization step.

A feed roll (1), where a positive electrode (6), in which the positive electrode active material layer is coated on the positive electrode current collector, is wound-up, is installed in the feed roll position. As shown in FIG. 2, the positive electrode (6) is wound-up to a wind-up roll (4) sequentially via the first guide (2), a heating press roll (3) and the second guide (2).

Surface temperature of the heating press roll (3) is set between the melting point of a binder contained in the positive electrode active material layer and a temperature obtained by subtracting 40° C. from the melting point; preferably between the melting point and a temperature obtained by subtracting 30° C. from the melting point; and more preferably between the melting point and a temperature obtained by subtracting 20° C. from the melting point. For example, in the case where PVDF (polyvinylidene fluoride: melting point is 150° C.) was used as the binder, heating in a range of 110 to 150° C. is preferable, and heating in a range of 120 to 150° C. is more preferable. In the case where a styrene-butadiene copolymer (melting point is 100° C.) was used as the binder, heating in a range of 60 to 100° C. is preferable, and heating in a range of 70 to 100° C. is more preferable.

Pressurization pressure and speed in carrying out heating press are adjusted by bulk density of the obtained positive electrode. Press pressure of a heating press roll is held constant by adjusting the pressure of a hydraulic cylinder (5). Pressure of the press is preferably 50 kgf/cm to 300 kgf/cm. Pressing velocity is preferably 15 m/min or slower, more preferably 10 m/min or slower, and still more preferably 5 m/min or slower. When the pressing velocity is in the above-described range, sufficient bulk density can be obtained.

When the press pressure is too high, because the active material layer is peeled off from the current collector, it is preferable that press pressure is determined by measuring the cell resistance or the discharge capacity retention rate.

Distance between press role themselves (distance between rolls) can be selected arbitrary. In the first time press, press is carried out in a at least narrower distance between rolls than thickness of the electrode to be pressed, however, in the distance between rolls near thickness of the electrode, effect of increasing bulk density by press is small, and in the case of too narrow a distance, the active material layer peels off from the current collector, and thus, it is preferable to select a distance between rolls by measuring the cell resistance or the discharge capacity retention rate.

The positive electrode of the present invention is preferably subjected to press two times or more. By pressing one time, bulk density cannot be increased sufficiently, or in order to increase bulk density, it is necessary to press under high pressure or too narrow a distance between rolls, resulting in peeling, and a decrease in the performance of the cell resistance or the discharge capacity retention rate. In the case of significant damage of the positive electrode, there may be the case where cell preparation cannot be carried out.

For example, in the case of carrying out the press two or more times, it is preferable that the distance between rolls in the second time press is equal to or preferably narrower than the distance between rolls in the first time. Specifically, by carrying out press under condition that the distance between rolls in the second time is 0.4 to 0.6, provided the distance between rolls in the first time is 1, and in the case of carrying out also the third time, the distance between rolls in the third time is 0.4 to 0.6, provided the distance between rolls in the second time is 1, bulk density required can be obtained. Further press may be carried out as needed. However, from the viewpoint of production efficiency, the number of presses is preferably about two times to three times. In the case of pressing two or more times, the first press may be carried out at room temperature.

The press pressure in the second press may be the same or higher relative to the first press. The higher press pressure is the more preferable from the viewpoint of enhancing density.

The heating press roll (3) is rotated in a direction where the positive electrode (6) is sent from the feed roll (1) to the wind-up roll (4), and controlled to arbitrary speed. The wind-up roll (4) auto-rotates so that tension of the electrode is proper value to wind-up the positive electrode (6). The feed roll (1) does not necessarily have to be auto-rotated; however, the feed roll (1) preferably has a sufficient load so that tension applied to the positive electrode (6) does not loosen.

<Negative Electrode Active Material>

As the negative electrode active material, a material capable of reversibly intercalating and deintercalating a lithium ion is preferably used. It includes, for example, a carbon material such as graphite, coke, hard carbon, activated carbon, or a composite porous carbon material, or a mixture thereof.

Still more preferably, the negative electrode active material is a composite porous material obtained by depositing a carbon material at the surface of the activated carbon. Into the negative electrode active material layer, a material which intercalates and deintercalates a lithium ion, of a lithium-titanium composite oxide or electric conductive filler can also be contained, in addition to this carbon material.

The above-described negative electrode active material may be used alone, or may be used by mixing two or more kinds. The above-described composite porous material can be obtained, for example, by heat treatment of the activated carbon and a carbon material precursor, in a state of making them coexisted.

A raw material to obtain the activated carbon to be used as a raw material of the above-described composite porous material, is not particularly limited, as long as the obtained composite porous material exerts the desired characteristics, and a commercial product obtained from various raw materials of a petroleum-based, a coal-based, a plant-based, or a polymer-based one can be used. In particular, it is preferable to use activated carbon powder having an average particle size of 1 μm to 10 μm. The average particle size is more preferably 2 μm to 6 μm. A measuring method of the above-described average particle size is the same as the measuring method to be used for average particle size of the activated carbon, which is the above-described positive electrode active material.

On the other hand, carbon material precursors to be used in the raw materials of the above-mentioned composite porous material is solid, liquid, or an organic material which is soluble in a solvent, which is capable of depositing the carbon material to the active carbon by heat treatment, and can include, for example, pitch, mesocarbon microbeads, coke, a synthetic resin such as a phenolic resin. Among these carbon material precursors, it is preferable to use cheap pitch, from the viewpoint of production cost. Pitch can be roughly classified into petroleum pitch and coal pitch. For example, as the petroleum pitch, there is exemplified, a distillation residue of crude oil, a flowable catalytic cracking residue (decant oil etc., bottom oil derived from a thermal cracker, ethylene tar obtained in the case of naphtha cracking.

In the case of using the above-described pitch, the composite porous material is obtained by depositing the carbon material on the activated carbon by subjecting volatile components or thermally decomposed components of the pitch to thermal reaction at the surface of the activated carbon. In this case, deposition of volatile components or thermally decomposed components of the pitch to the inside of a pore of the activated carbon proceeds at a temperature of about 200 to 500° C., and a conversion reaction of the deposited components to the carbon material proceeds at a temperature of 400° C. or more. Peak temperature in heat treatment is determined as appropriate, by characteristics of the obtained composite porous material, a thermal reaction pattern, and thermal reaction atmosphere, however, it is preferably 400° C. or more, more preferably 450° C. to 1000° C., and still more preferably about 500 to 800° C. Time for maintaining the peak temperature in heat treatment may be sufficient for 30 minutes to 10 hours, and is preferably 1 to 7 hours, and more preferably 2 to 5 hours. For example, in the case where heat treatment is carried out at the peak temperature of about 500 to 800° C. over 2 hours to 5 hours, it is believed that the carbon material deposited on the surface of the activated carbon is converted to a polycyclic aromatic hydrocarbon.

A manufacturing method for the above-described composite porous material includes, for example, a method for heat treating the activated carbon in inert gas atmosphere containing hydrocarbon gas volatilize from the carbon material precursor to deposit the carbon material onto the activated carbon in a vapor phase. A method for mixing the activated carbon and the carbon material precursor in advance and carry out heat treatment; or a method for coating the carbon material precursor, dissolved in a solvent, on to the activated carbon, and after drying it, carrying out heat treating is also possible.

The composite porous material is the one in which the carbon material is deposited onto the surface of the activated carbon, and pore distribution after the carbon material is deposited inside a pore of the activated carbon is important, and it is specified by the mesopore volume and the micro-pore volume. In the embodiment of the present invention, in particular, ratio of the mesopore volume/the micro-pore volume is important, together with absolute value of the mesopore volume and the micro-pore volume. That is, in one aspect of the present invention, it is preferable that $0.01 \leq Vm1 \leq 0.20$ and $0.01 \leq Vm2 \leq 0.40$, provided that mesopore volume derived from a pore having a diameter of 20 Å to 500 Å, calculated by the BJH method, is Vm1 (cc/g), and micro-pore volume derived from a pore having a diameter of smaller than 20 Å, calculated by the MP method, is Vm2 (cc/g), in the above-described composite porous material.

When the mesopore volume Vm1 is the upper limit or less ($Vm1 \leq 0.200$), high charge-discharge efficiency to a lithium ion can be maintained, and when the mesopore volume Vm1 and the micro-pore volume Vm2 are the lower limit or more ($0.01 \leq Vm1$, $0.01 \leq Vm2$), high output characteristics can be maintained.

A measuring method of the above-described mesopore volume Vm1 and the micro-pore volume Vm2 is similar to the measuring method of the mesopore volume V1 and the micro-pore volume V2 in the above-described positive electrode active material.

In order to obtain the composite porous material having a pore distribution range specified by the present invention, pore distribution of the activated carbon to be used as a raw material is important. In the activated carbon to be used in formation of the composite porous material as the negative electrode active material, it is preferable that $0.05 \leq Vm3 \leq 0.50$, and $0.05 \leq Vm4 \leq 1.00$, provided that mesopore volume derived from a pore having a diameter of 20 Å to 500 Å, calculated by the BJH method, is Vm3 (cc/g), and micro-pore volume derived from a pore having a diameter of smaller than 20 Å, calculated by the MP method, is Vm4 (cc/g).

Average particle size of the composite porous material is preferably 1 μm to 10 μm. The lower limit thereof is more preferably 2 μm or more, and still more preferably 2.5 μm or more. The upper limit is more preferably 6 μm or less, and still more preferably 4 μm or less. When the average particle size is 1 μm to 10 μm, good durability can be maintained. A measuring method for average particle size of the above-described composite porous material is the same as the measuring method used for average particle size of the activated carbon the above-described positive electrode active material.

Atomic ratio of a hydrogen atom/a carbon atom (hereafter it may also be referred to as H/C), in the above-described composite porous material, is preferably 0.05 to 0.35, and more preferably 0.05 to 0.15. The case where H/C is 0.35 or less is preferable, from the viewpoint of enhancing capacity (energy density) and charge-discharge efficiency, because a structure (specifically, a polycyclic aromatic conjugated structure) of the carbon material deposited at the surface of the activated carbon develops sufficiently. On the other hand, in the case where H/C is 0.05 or more, sufficient energy density is obtained, because carbonization never proceeds excessively. H/C is measured by an element analysis apparatus.

The above-described composite porous material usually has an amorphous structure derived from a raw material activated carbon, as well as a crystal structure derived from mainly a carbon material deposited. According to a wide-angle X-ray diffraction method, as for the composite porous material, the one having a spacing $d_{002}$ of the (002) plane of 3.60 Å to 4.00 Å, and crystallite size Lc of 8.0 Å to 20.0 Å in a c-axis direction obtained from half peak width of this peak, is preferable, and the one having the $d_{002}$ of 3.60 Å to 3.75 Å, and crystallite size Lc of 11.0 Å to 16.0 Å in a c-axis direction, obtained from half peak width of this peak, is more preferable, in the view points that a structure having low crystallinity is preferable to exert high output characteristics, and a structure having high crystallinity is preferable to keep reversibility in charge-discharge.

It is also preferable that the negative electrode active material is a hard carbon material. The hard carbon material is not especially limited; however, the following materials are exemplified as preferable ones. There is included such a hard carbon material obtained by heating or calcining a low-molecular weight organic compound such as naphthalene and anthracene; resins such as a phenolic resin, a furan resin, a furfural resin, and a cellulose-type resin; pitches such as coal-tar pitch, oxygen cross-linked petroleum pitch, petroleum-type and coal-type pitch, as a raw material. As for a heating or calcining method described here, it may be in accordance with a known method. For example, it is obtained by carbonization of the above-described raw material under inert gas atmosphere such as nitrogen, in a temperature range of about 500 to 1200° C. In the hard carbon material in the present invention, a polyacene-type material is also included. The polyacene-type material is a material having a polyacene structure obtained by carbonization of, for example, a phenolic resin. The material obtained by heating or calcining as described above may be used as it is, or the material having increased pore volume by further treatment of activation, may be used. As needed, the material pulverized using a known pulverizing machine such as a ball mill may also be used. These hard carbon materials can be used alone or in combination of two or more types of hard carbon materials.

As for a fire pore structure of the hard carbon material in the present invention, it is preferably a carbon material satisfying 0.001≤Vm1<0.01, and 0.001≤Vm2<0.01, provided that mesopore volume derived from a pore having a diameter of 20 Å to 500 Å calculated by the BJH method, is Vm1 (cc/g), and micro-pore volume derived from a pore having a diameter of smaller than 20 Å calculated by the MP method, is Vm2 (cc/g). A calculation method for Vm1 and Vm2 described here is similar to the method explained in the paragraph of the activated carbon, which is the positive electrode active material. When both Vm1 and Vm2 are 0.01 or more, with increase in pores, output characteristics enhances. However, it is difficult to sufficiently increase density of the active material layer, which may result in a decrease in capacity per volume, or with enhancement of contact area with the electrolytic solution, a decrease in durability tends to be caused by an increase in leak current. Therefore it is preferably Vm1<0.0095, and Vm2<0.0070, and more preferably Vm1<0.0085, and Vm2<0.0050.

It is preferable that an average particle size of the hard carbon material in the present invention is 5 to 30 μm. The average particle size described here can be measured by a method similar to the method explained for the activated carbon, which is the positive electrode active material. When the average particle size is below 5 μm, density of the active material layer decreases and capacity per volume decreases, and thus it is not preferable. Still more, small average particle size has a defect such as decreasing durability. On the contrary, when the average particle size is larger than 30 μm, it is not suitable for high speed charge-discharge. Therefore it is preferably 6 to 25 μm, and still more preferably 7 to 20 μm.

(Negative Electrode)

The negative electrode may be the one in which the negative electrode active material layer is formed only at one side of the negative electrode current collector, or may be the one in which the negative electrode active material layer is formed at both sides. Thickness of the negative electrode active material layer is preferably, for example, 20 μm to 100 μm per one side.

The material of the negative electrode current collector is not particularly limited, as long as it does not cause deterioration by elution or reaction, when making the electrical storage element, and includes, for example, copper, iron and stainless steel, and copper is more preferable as the negative electrode current collector. As for shape of the negative electrode current collector, a metal foil or a structure capable of forming an electrode in a void of a metal can be used, and the metal foil may be a usual metal foil not having a through hole, or may be a metal foil having a through hole, of an expanded metal, punching metal. Thickness of the negative electrode current collector is not especially limited, as long as shape and strength of the negative electrode can be sufficiently maintained, and is preferably, for example, 1 to 100 μm.

Into the above-described negative electrode active material layer, electric conductive filler and binder can be added, as needed, other than the negative electrode active material. The type of the electric conductive filler is not particularly limited; however, acetylene black, Ketjen black, and vapor grown carbon fiber are exemplified. The amount of the electric conductive filler is preferably, for example, 0 to 30% by weight to the negative electrode active material. As the binder, PVdF (polyvinylidene fluoride), PTFE (polytetrafluoroethylene), or a styrene-butadiene copolymer can be used, but the binder is not particularly limited. The amount of the binder is preferably, for example, 3 to 20% by weight to 100 parts by weight of the negative electrode active material.

The negative electrode can be manufactured by a known electrode formation method of the lithium ion battery, or the electric double layer capacitor, and is obtained, for example, by a coating step for coating the slurry, in which the negative electrode active material, the electric conductive filler and the binder are dispersed in a solvent, on the current collector as the active material layer, a drying step for drying the solvent, and a pressurizing step for pressing, as needed.

The negative electrode may be manufactured by a method containing a forming step for mixing the negative electrode active material and the binder in a dry system, not by the above-described method using a solvent, and forming them to a plate-shape by pressurizing them; and an bonding step for attaching the negative electrode active material layer formed to the negative electrode current collector using electric conductive adhesives.

It is preferable that a lithium ion is doped in advance into the negative electrode. The doping amount is preferably in a range of 30 to 100%, and more preferably in a range of 40 to 80% of a lithium ion in which the negative electrode active material can intercalate.

By doping the lithium ion in advance into the negative electrode active material, negative electrode potential is low, and cell voltage is high in combination of the positive electrode, as well as high capacity is obtained by high utilization capacity of the positive electrode, and high energy density can be obtained.

A method for doping the lithium ion into the negative electrode in advance is not particularly limited in the present invention, and a known method can be used. For example, a method for forming the negative electrode active material into the negative electrode, and then using the negative electrode as a working electrode, and metal lithium as a counter electrode, and preparing an electrochemical cell combined a non-aqueous electrolytic solution, and doping the lithium ion electrochemically. It is also possible to dope a lithium ion into the negative electrode, by crimping a metal lithium foil onto the negative electrode and putting it into the non-aqueous electrolytic solution.

(Separator)

As the separator, a micro porous membrane made of polyethylene or a micro porous membrane made of polypropylene, which is used in the lithium ion secondary battery, or non-woven paper made of cellulose, which is used in the electric double layer capacitor, can be used.

It is preferable that a thickness of the separator is 10 µm to 50 µm. When the thickness is 10 µm or thicker, it is superior in suppression of self-discharge caused by a micro short circuit on the inside, and when the thickness is 50 µm or thinner, it is superior in energy density and output characteristics of the electrical storage element.

(Electrode Terminal)

The electrode terminal (the positive electrode terminal and the negative electrode terminal are referred collectively) generally has a nearly rectangular shape, and one end thereof is electrically connected to the current collector of the electrode, and the other end is electrically connected to outer load (in the case of discharging) or a power source (in the case of charging), during use. One end of the positive electrode terminal is electrically connected to the positive electrode, and one end of the negative electrode terminal is electrically connected to the negative electrode. Specifically, the positive electrode terminal is electrically connected to the non-coated region of the positive electrode active material layer of the positive electrode current collector, and the negative electrode terminal is electrically connected to the non-coated region of the negative electrode active material layer of the negative electrode current collector. It is preferable that a material of the positive electrode terminal is aluminum, and a material of the negative electrode terminal is nickel plated copper.

It is a preferable that, at the center part of the electrode terminal, which is a sealed part of the following laminated film outer casing, a film made of a resin such as polypropylene, is attached. In this way, short circuit of the electrode terminal and the metal foil composing the laminated film is prevented, and also seal integrity is enhanced.

As the electrical connection method of the above-described electrode laminate and electrode terminal, for example, an ultrasonic welding method is frequently used; however, resistance welding or laser welding may be acceptable, and therefore the connection method is not particularly limited.

(Outer Casing)

As a metal can to be used in the outer casing, the one made of aluminum is preferable. The outer casing can also be formed by a laminated film, and the laminated film to be used in that case is preferable that is a film in which a metal foil and a resin film are laminated, and the one having three-layer composition consisting of an outer layer resin film/a metal foil/an inner layer resin film is exemplified. The outer layer resin film is for preventing the metal foil from receiving damage caused by contact, and a resin such as nylon or polyester can be used suitably. The metal foil is for preventing permeation of moisture or gas, and a foil of copper, aluminum, or stainless steel can be used suitably. The inner layer resin film is for protecting the metal foil from the electrolytic solution stored inside, as well as for melt sealing in heat sealing, and a polyolefin or an acid modified polyolefin can be used suitably.

(Non-Aqueous Electrolytic Solution)

In the present embodiment, as a solvent for the non-aqueous electrolytic solution used in the electrical storage element, there can be used a cyclic carbonate ester represented by ethylene carbonate (EC), propylene carbonate (PC); a chained carbonate ester represented by diethyl carbonate (DEC), dimethyl carbonate (DMC), ethyl methyl carbonate (MEC); lactones such as γ-butyrolactone (γBL), or a mixed solvent thereof.

An electrolyte dissolved into the solvent is necessary to be a lithium salt, and as a preferable lithium salt, there is included $LiBF_4$, $LiPFE$, $LiN(SO_2C_2F)_2$, $LiN(SO_2CF_3)(SO_2C_2F_6)$, $LiN(SO_2CF_3)(SO_2C_2F_4H)$, or a mixed salt thereof. Concentration of the electrolyte in the non-aqueous electrolytic solution is preferably in a range of 0.5 to 2.0 mol/L. When the concentration is 0.5 mol/L or more, supply of a negative ion is sufficient and capacity of the electrical storage element is high. On the other hand, when the concentration is 2.0 mol/L or less, there is no risk of decreasing in conductivity and decrease in output characteristics, on the contrary, caused by deposition of a not-dissolved salt in the electrolytic solution, or excessive viscosity of the electrolytic solution.

(Electrical Storage Element)

In the non-aqueous lithium-type electrical storage element of the present embodiment, the positive electrode and the negative electrode are inserted into the outer casing formed from a metal can or a laminated film, as an electrode body laminated or windingly laminated via the separator.

One embodiment of the non-aqueous lithium-type electrical storage element of the present embodiment is shown in a cross-sectional schematic drawing of FIGS. 1 (*a*) and (*b*), and is an aspect, in which a positive electrode terminal (7) and a negative electrode terminal (8) are derived from one side of an electrode body (10). As another embodiment, there is included an aspect, in which the positive electrode terminal (7) and the negative electrode terminal (8) are derived from opposing two sides of the electrode body (10). The latter embodiment is suitable for a large current, because an electrode terminal can be widened.

The electrical storage element is obtained by alternately laminating a positive electrode (16), in where a positive electrode active material layer (12) is laminated on a positive electrode current collector (11), and a negative electrode (17), in which a negative electrode active material layer (15) is laminated at a negative electrode current collector (14), so that the positive electrode active material layer (12) and the negative electrode active material layer (15) face each other by sandwiching a separator (13), and then forming the electrode body (10); connecting the positive electrode terminal (7) to the positive electrode current collector (11); and also connecting the negative electrode terminal (8) to the negative electrode current collector (14); storing the electrode body (10) into an outer casing (9); injecting a non-aqueous electrolytic solution (not shown) into the outer casing (9); and sealing a peripheral part of the outer casing (9) in a state in which terminals of the positive electrode terminal (7) and the negative electrode terminal (8) are pulled out outside of the outer casing (9).

EXAMPLES

Explanations will be given below specifically on the present invention with reference to Examples and Comparative Examples; however, the present invention is not limited thereto.

Example 1

Preparation of Positive Electrode

A phenolic resin was subjected to carbonization treatment under nitrogen atmosphere at 600° C. for 2 hours. Then, the calcined product was pulverized using a ball mill and classified to obtain a carbonized product having an average particle size of 7 μm.

This carbonized product and KOH were mixed in a weight ratio of 1:3.5, and the mixture was heated in a furnace under nitrogen atmosphere at 800° C. for 1 hour to activate the mixture. Then, the activated product was washed under stirring for 1 hour using diluted hydrochloric acid, which was adjusted to 2 mol/L, then washed by boiling with distilled water till pH thereof stabilizes between 5 to 6, and then dried to prepare an activated carbon.

Pore distribution of the present activated carbon was determined by the above-described method, using a pore distribution measuring device (AUTOSORB-1 AS-1-MP), manufactured by Yuasa Ionics Co., Ltd., and BET specific surface area by a BET one point method. As the result, mesopore volume V1 was 1.02 cc/g, micro-pore volume V2 was 1.10 cc/g, and BET specific surface area was 2650 $m^2$/g.

By using this activated carbon as the positive active material, a slurry-like active material layer was obtained by mixing 83.4 parts by weight of the activated carbon, 8.3 parts by weight of electric conductive carbon black (Ketjen black ECP600JD, produced by Lion Corporation) and 8.3 parts by weight of PVDF (polyvinylidene fluoride, KF polymer, W#: 9300, produced by Kureha Corporation; melting point: 163° C.) with NMP (N-methylpyrrolidone). Next, the obtained active material layer was coated on one side of an aluminum foil having a thickness of 15 μm, and dried. Bulk density of the electrode active material layer was 0.31 g/$cm^3$. Bulk density of the electrode active material layer was calculated and determined by sufficiently drying an electrode in a dry room managed having a dew point of −60° C. or less, and determining weight of the electrode excluding the current collector, and thickness of the electrode active material layer excluding thickness of the current collector. For measurement of the thickness, DG-4120 manufactured by Ono Sokki Co., Ltd. was used.

The electrode coated with the active material layer was installed in feed roll position of FIG. 1, and pressed under a line pressure of 110 kgf/cm, a distance between rolls of 60 μm in the first press, and 30 μm in the second press, using a heating press roll apparatus (MSC-31, manufactured by Yuri Roll Machine Co., Ltd.) heated at 140° C. to obtain a positive electrode having a bulk density of the electrode active material layer of 0.48 g/$cm^3$, and a thickness of 65 μm. Press was carried out at a velocity of 5 m/min. For a measuring method for temperature of the heating roll, roll surface temperature was detected in a contactless manner, using an infrared radiation thermometer, IT2-60 manufactured by KEYENCE Co., Ltd., and the temperature was adjusted at a predetermined temperature by PID control. Line pressure was calculated from pressure applied on the pressurization roll, and contact length of the upper and the lower rolls.

(Preparation of Negative Electrode)

A cured product of phenolic was place onto a stainless steel bat, and subjected to thermal reaction. The thermal reaction was carried out under a nitrogen atmosphere, by increasing the temperature in a furnace to 700° C., and maintained at the same temperature for 4 hours, and then it was subjected to natural cooling. The obtained material was pulverized using a planetary ball mill to obtain a hard carbon material as the negative electrode active material. Pore distribution of the present carbon material was measured by the above-described method, using a pore distribution measuring device (AUTOSORB-1 AS-1-MP), manufactured by Yuasa Ionics Co., Ltd. As the result, mesopore volume Vm1 was 0.0084 cc/g, micro-pore volume Vm2 was 0.0061 cc/g. Lithium ion intercalation capacity of this negative electrode was 600 mAh/g.

Next, a slurry was obtained by mixing 83.4 parts by weight of the negative electrode active material obtained above, 8.3 parts by weight of acetylene black (Denka black, produced by DENKIKAGAKU KOGYO K.K.) and 8.3 parts by weight of PVDF (polyvinylidene fluoride, KF polymer, W#: 9300, produced by Kureha Corporation; melting point: 163° C.) with NMP (N-methylpyrrolidone). Next, the obtained slurry was coated onto one side of a copper foil having a thickness of 14 μm, dried and pressed to obtain the negative electrode having a thickness of 60 μm.

The negative electrode obtained above was cut out so as to be an area of 3 $cm^2$, to use as an working electrode, and by using metal lithium as a counter electrode and reference electrode, and using a solution, in which $LiPF_6$ was dissolved in a concentration of 1 mol/L, in a solvent of ethylene carbonate and methyl ethyl carbonate mixed in a weight ratio of 1:4, as the electrolytic solution, an electrochemical cell was prepared in an argon dry box. This electrochemical cell was subjected firstly to constant current charging in a rate of 85 mAh/g relative to weight of the negative electrode active material, till attaining 1 mV relative to lithium potential, using a charge-discharge apparatus (TOSCAT-3100U), manufactured by Toyo System co., Ltd., and then constant voltage charging was carried out under 1 mV, and a lithium ion of 500 mAh/g in total relative to weight of the negative electrode active material was doped in advance.

(Assembly and Performance Evaluation of Electrical Storage Element)

The positive electrode obtained above was cut out so as to have a surface area of 3 cm$^2$, and this positive electrode and the above-described negative electrode doped with lithium in advance, ultrasonic welded to a positive electrode terminal and a negative electrode terminal, respectively, which were faced by sandwiching an unwoven separator made of cellulose having a thickness of 30 μm, and stored in an outer casing composed of a laminated film laminated with polypropylene, aluminum and nylon. A lithium ion capacitor was assembled by injecting the electrolytic solution into the outer casing, and heat sealing the outer casing in a state that the positive electrode terminal and the negative electrode terminal were pulled out to the exterior of the outer casing. At this time, a solution, in which LiPFE was dissolved, so as to attain a concentration of 1 mol/L, into a mixed solvent of ethylene carbonate and methyl ethyl carbonate in 1:4 (weight ratio), was used as the electrolytic solution.

The lithium ion capacitor prepared was charged to 4.0 V under a current of 1 mA, using a charge-discharge apparatus (ACD-01), manufactured by Aska Electronic Co., Ltd and then subjected to constant current constant voltage charging, on which a constant voltage of 4.0 V was applied, for 2 hours. Subsequently, it was discharged down to 2.0 V under a current of 1 mA. Discharge capacity was 0.711 mAh. Capacity per weight of the active material of the electrode was 165 F/g, and capacity (hereafter, it may also be referred to as "volume capacity") per volume of the electrode active material layer was 79 F/cm$^3$.

Next, similar charging was carried out and discharged down to 2.0 V under 100 mA, a discharge capacity of 0.626 mAh was obtained. A ratio of discharge capacity under 100 mA to discharge capacity under 1 mA was 88%, which is good.

In this case, 1 mA corresponds to 1.41 C. Because the active material in the positive electrode active material layer is 83.4 parts by weight, capacity per weight of the positive electrode active material layer was 165×(83.4/100)=138 F/g, and a product of a ratio of discharge capacity under a high current condition to discharge capacity under a low current condition, was 138×0.88=121.1 which is 115 or more.

Electric resistance was measured using current of A.C. 1 kHz, and found to be 0.41Ω.

Example 2

Preparation of Positive Electrode

An activated carbon was prepared under the same condition as in Example 1, except for mixing the carbonized product and KOH in a weight ratio of 1:4.3, in the activation method described in Example 1. Measurement was carried out on this activated carbon similarly as in Example 1, and found that mesopore volume V1 was 1.33 cc/g, micro-pore volume V2 was 1.88 cc/g, and BET specific surface area was 3120 m$^2$/g. By using this activated carbon, a slurry-like active material layer was obtained by a similar method as in Example 1, which was coated on one side of an aluminum foil having a thickness of 15 μm, and dried. Bulk density of the electrode active material layer was 0.29 g/cm$^3$.

The electrode coated with the active material layer was installed in a heating press roll apparatus, similarly as in Example 1, and pressed under a line pressure of 120 kgf/cm, a distance between rolls of 60 μm in the first press, and 30 μm in the second press, using the heating press roll heated at 140° C. to obtain a positive electrode having a bulk density of the electrode active material layer of 0.47 g/cm$^3$, and a thickness of 66 μm. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged up to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.754 mAh. Capacity per weight of the active material of the electrode was 175 F/g, and volume capacity was 82 F/cm$^3$.

Next, similar charging was carried out, and discharged down to 2.0 V under 100 mA, and then the discharge capacity of 0.671 mAh was obtained. Ratio of discharge capacity under 100 mA to discharge capacity under 1 mA was 89%, which is good.

In this case, 1 mA corresponds to 1.33 C. Capacity per weight of the positive electrode active material layer was 146 F/g, by similar calculation as in Example 1, and a product of a ratio of discharge capacity under a high current condition, relative to discharge capacity under a low current condition was 129.9 which is 115 or more.

In addition, electric resistance was measured using current of A.C. 1 kHz, and found to be 0.39Ω.

Example 3

Preparation of Positive Electrode

An activated carbon was prepared under the same condition as in Example 1, except for mixing the carbonized product and KOH in a weight ratio of 1:5, in the activation method described in Example 1. Measurement was carried out on this activated carbon similarly as in Example 1, and found that mesopore volume V1 was 1.50 cc/g, micro-pore volume V2 was 2.28 cc/g, and BET specific surface area was 3627 m$^2$/g. By using this activated carbon, a slurry-like active material layer was prepared by a similar method as in Example 1, which was coated on one side of an aluminum foil having a thickness of 15 μm, and dried. Bulk density of the electrode active material layer was 0.28 g/cm$^3$.

The electrode coated with the active material layer was installed in a heating press roll apparatus, similarly as in Example 1, and pressed under a line pressure of 130 kgf/cm, a distance between rolls of 60 μm in the first press, and 30 μm in the second press, using the heating press roll heated at 140° C. to obtain a positive electrode having a bulk density of the electrode active material layer of 0.46 g/cm$^3$, and a thickness of 67 μm. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged up to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.776 mAh. Capacity per weight of the active material of the electrode was 180 F/g, and volume capacity was 83 F/cm$^3$.

Next, similar charging was carried out, and discharged down to 2.0 V under 100 mA, a discharge capacity of 0.706 mAh was obtained. Ratio of discharge capacity under 100 mA to discharge capacity under 1 mA was 91%, which is good.

In this case, 1 mA corresponds to 1.29 C. Capacity per weight of the positive electrode active material layer was 150 F/g, by similar calculation as in Example 1, and a product of a ratio of discharge capacity under a high current condition to discharge capacity under a low current condition was 136.6 which is 115 or more.

In addition, electric resistance was measured under an alternating current of 1 kHz, and found to be 0.39Ω.

Example 4

Preparation of Positive Electrode

The carbonized product and KOH was mixed in a weight ratio of 1:3.5, in the activation method described in Example 1, and the activated carbon obtained by boil-washing after heating the mixture in a furnace under a nitrogen atmosphere at 800° C. for 1 hour, was further subjected to steam activation treatment at 900° C. for 1 hour, while flowing the mixed gas of steam and nitrogen into the furnace. The steam activated carbon was 3 g, and steam was injected taking 1 hour by vaporizing 18 g of water. Measurement was carried out on this activated carbon similarly as in Example 1, and found that mesopore volume V1 was 1.31 cc/g, micro-pore volume V2 was 0.92 cc/g, and BET specific surface area was 2534 m$^2$/g. By using this activated carbon, a slurry-like active material layer was prepared by a similar method as in Example 1, which was coated on one side of aluminum foil having a thickness of 15 μm, and dried. Bulk density of the electrode active material layer was 0.31 g/cm$^3$.

The electrode coated with the active material layer was installed in a heating press roll apparatus, similarly as in Example 1, and pressed under a line pressure of 110 kgf/cm, a distance between rolls of 60 μm in the first press, and 30 μm in the second press, using the heating press roll heated at 140° C. to obtain a positive electrode having a bulk density of the electrode active material layer of 0.48 g/cm$^3$, and a thickness of 65 μm. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged to 4.0 V under a current of 1 mA, and then subjected to constant current constant voltage charging, in which a constant voltage of 4.0 V was applied, for 2 hours, using a charge-discharge apparatus (ACD-01) manufactured by Aska Electronic Co., Ltd. Subsequently, it was discharged down to 2.0 V under a current of 1 mA. Discharge capacity was 0.669 mAh. Capacity per weight of the active material of the electrode was 155 F/g, and volume capacity was 74 F/cm$^3$.

Next, similar charging was carried out, and discharged down to 2.0 V under 100 mA, and then the discharge capacity of 0.615 mAh was obtained. Ratio of discharge capacity under 100 mA to discharge capacity under 1 mA was 92%, which is good.

In this case, 1 mA corresponds to 1.50 C. Capacity per weight of the positive electrode active material layer was 129 F/g by similar calculation as in Example 1, and a product of a ratio of discharge capacity under a high current condition to discharge capacity under a low current condition was 118.9 which is 115 or more.

In addition, electric resistance was measured under an alternating current of 1 kHz, and found to be 0.39Ω.

Example 5

Preparation of Positive Electrode

An activated carbon was prepared under the same condition as in Example 1, except for adjusting the average particle size of the carbonized product obtained by calcining a phenolic resin to 10 μm, by changing conditions of pulverization, and mixing the carbonized product and KOH in a weight ratio of 1:4.3, in the activation method described in Example 1. Measurement was carried out on this activated carbon similarly as in Example 1, and it was found that mesopore volume V1 was 1.22 cc/g, micro-pore volume V2 was 1.79 cc/g, and BET specific surface area was 3051 m$^2$/g. By using this activated carbon, a slurry-like active material layer was prepared by a similar method as in Example 1, which was coated on one side of aluminum foil having a thickness of 15 μm, and dried. Bulk density of the electrode active material layer was 0.31 g/cm$^3$.

The electrode coated with the active material layer was installed in a heating press roll apparatus, similarly as in Example 1, and pressed under a line pressure of 120 kgf/cm, a distance between rolls of 60 μm in the first press, and 30 μm in the second press, using the heating press roll heated at 140° C. to obtain a positive electrode having a bulk density of the electrode active material layer of 0.47 g/cm$^3$, and a thickness of 66 μm. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged up to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.750 mAh. Capacity per weight of the active material of the electrode was 174 F/g, and volume capacity was 82 F/cm$^3$.

Next, similar charging was carried out, and discharged down to 2.0 V under 100 mA, and then the discharge capacity of 0.661 mAh was obtained. Ratio of discharge capacity under 100 mA to discharge capacity under 1 mA was 88%, which is good.

In this case, 1 mA corresponds to 1.33 C. Capacity per weight of the positive electrode active material layer was 145 F/g, by similar calculation as in Example 1, and a product of a ratio of discharge capacity under a high current condition, relative to discharge capacity under a low current condition was 127.7 which is 115 or more.

In addition, electric resistance was measured under an alternating current of 1 kHz, and found to be 0.39Ω.

Example 6

Preparation of Positive Electrode

An activated carbon was prepared under the same condition as in Example 1, except for adjusting the average particle size of the carbonized product obtained by calcining a phenolic resin to 10 μm, by changing pulverizing condition, and mixing the carbonized product and KOH in a weight ratio of 1:4.3, in the activation method described in Example 1. Measurement was carried out on this activated carbon similarly as in Example 1, and it was found that mesopore volume V1 was 1.34 cc/g, micro-pore volume V2 was 1.76 cc/g, and BET specific surface area was 3205 m$^2$/g. By using this activated carbon, a slurry-like active material layer was prepared by a similar method as in Example 1, which was coated on one side of aluminum foil having a thickness of 15 μm, and dried. Bulk density of the electrode active material layer was 0.29 g/cm$^3$.

The electrode coated with the active material layer was installed in a heating press roll apparatus, similarly as in Example 1, and pressed under a line pressure of 120 kgf/cm, a distance between rolls of 60 μm in the first press, and 30 μm in the second press, using the heating press roll heated at 140° C. to obtain a positive electrode having a bulk density of the electrode active material layer of 0.46 g/cm$^3$, and a thickness of 67 μm. The speed of the roll press was 5 m/min.
(Preparation of Negative Electrode)

Preparation of negative electrode was carried out similarly as in Example 1.
(Assembly and Performance Evaluation of Electrical Storage Element)

Assembly of a lithium ion capacitor was carried out similarly as in Example 1.

The lithium ion capacitor prepared was charged up to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.758 mAh. Capacity per weight of the active material of the electrode was 176 F/g, and volume capacity was 81 F/cm$^3$.

Next, similar charging was carried out, and discharged down to 2.0 V under 100 mA, and then the discharge capacity of 0.697 mAh was obtained. Ratio of discharge capacity under 100 mA to discharge capacity under 1 mA was 92%, which is good.

In this case, 1 mA corresponds to 1.32 C. Capacity per weight of the positive electrode active material layer was 147 F/g, by similar calculation as in Example 1, and a product of a ratio of discharge capacity under a high current condition, relative to discharge capacity under a low current condition was 135.0 which is 115 or more.

Example 7

Preparation of Positive Electrode

The electrode, coated with the active material layer on the aluminum foil in Example 1, was pressed under a line pressure of 120 kgf/cm, and a distance between rolls of 60 μm in the first press, using a roll at room temperature without heating, and under a line pressure of 120 kgf/cm, and a distance between rolls of 30 μm in the second press, using the heating press roll heated at 140° C. to obtain a positive electrode having a bulk density of the electrode active material layer of 0.46 g/cm$^3$, and a thickness of 67 μm. The speed of the roll press was 5 m/min.
(Preparation of Negative Electrode)

Preparation of negative electrode was carried out similarly as in Example 1.
(Assembly and Performance Evaluation of an Electrical Storage Element)

Assembly of a lithium ion capacitor was carried out similarly as in Example 1.

The lithium ion capacitor prepared was charged up to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.709 mAh. Capacity per weight of the active material of the electrode was 165 F/g, and volume capacity was 76 F/cm$^3$.

Next, similar charging was carried out, and discharged down to 2.0 V under 100 mA, and then the discharge capacity of 0.617 mAh was obtained. Ratio of discharge capacity under 100 mA to discharge capacity under 1 mA was 87%, which is good.

In this case, 1 mA corresponds to 1.41 C. Capacity per weight of the positive electrode active material layer was 138 F/g, by similar calculation as in Example 1, and a product of a ratio of discharge capacity under a high current condition, relative to discharge capacity under a low current condition was 119.7 which is 115 or more.

In addition, electric resistance was measured under an alternating current of 1 kHz, and found to be 0.41Ω.

In comparing Example 1 and Example 7, it was found that Example 1, in which press was carried out two times using a heated roll, provided higher bulk density of the electrode and also a better discharge capacity retention rate.

Example 8

Preparation of Positive Electrode

The electrode coated with the active material layer on the aluminum foil in Example 1, was installed in a heating press roll apparatus, and pressed under a line pressure of 120 kgf/cm, a distance between rolls of 60 μm in the first press, and 36 μm in the second press, using the heating press roll heated at 140° C. to obtain a positive electrode having a bulk density of the electrode active material layer of 0.46 g/cm$^3$, and a thickness of 67 μm. The speed of the roll press was 5 m/min.
(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged up 4.0 V under a current of 1 mA, and then subjected to constant current constant voltage charging for 2 hours, on which a constant voltage of 4.0 V was applied, using a charge-discharge apparatus (ACD-01), manufactured by Aska Electronic Co., Ltd. Subsequently, it was discharged down to 2.0 V under a current of 1 mA. Discharge capacity was 0.707 mAh. Capacity per weight of the active material of the electrode was 164 F/g, and volume capacity was 75 F/cm$^3$.

Next, similar charging was carried out, and discharged down to 2.0 V under 100 mA, and then the discharge capacity of 0.629 mAh was obtained. Ratio of discharge capacity under 100 mA to discharge capacity under 1 mA was 89% which is good.

In this case, 1 mA corresponds to 1.42 C. Capacity per weight of the positive electrode active material layer was 137 F/g, by similar calculation as in Example 1, and a product of a ratio of discharge capacity under a high current condition to discharge capacity under a low current condition was 121.7 which was 115 or more.

In addition, electric resistance was measured under an alternating current of 1 kHz, and found to be 0.39Ω.

Example 9

Preparation of Positive Electrode

The electrode coated with the active material layer on the aluminum foil in Example 1 was installed in a heating press roll apparatus, and pressed under a line pressure of 120 kgf/cm, and a distance between rolls of 60 μm in the first press, and a distance between rolls of 24 μm in the second press, using the heating press roll heated at 140° C. to obtain a positive electrode having a bulk density of the electrode active material layer of 0.48 g/cm$^3$, and a thickness of 65 μm. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged to 4.0 V under a current of 1 mA, and then subjected to constant current constant voltage charging for 2 hours, on which a constant voltage of 4.0 V was applied, using a charge-discharge apparatus (ACD-01) manufactured by Aska Electronic Co., Ltd. Subsequently, it was discharged down to 2.0 V under a current of 1 mA. Discharge capacity was 0.709 mAh. Capacity per weight of the active material of the electrode was 166 F/g, and volume capacity was 80 F/cm$^3$.

Next, similar charging was carried out, and discharged down to 2.0 V under 100 mA, and then the discharge capacity of 0.638 mAh was obtained. Ratio of discharge capacity under 100 mA, relative to discharge capacity under 1 mA was 90%, which is good.

In this case, 1 mA corresponds to 1.41 C. Capacity per weight of the positive electrode active material layer was 138 F/g, by similar calculation as in Example 1, and a product of a ratio of discharge capacity under a high current condition, relative to discharge capacity under a low current condition was 124.6 which is 115 or more.

In addition, electric resistance was measured under an alternating current of 1 kHz, and found to be 0.40Ω.

Comparative Example 1

Preparation of Positive Electrode

An activated carbon was prepared under the same condition as in Example 1, except for mixing the carbonized product and KOH in a weight ratio of 1:3, in the activation method described in Example 1. Measurement was carried out on this activated carbon similarly as in Example 1, and it was found that mesopore volume V1 was 0.26 cc/g, micro-pore volume V2 was 1.04 cc/g, and BET specific surface area was 2122 m$^2$/g. By using this activated carbon, a slurry-like active material layer was obtained by a similar method as in Example 1, which was coated on one side of aluminum foil having a thickness of 15 μm, and dried. Bulk density of the electrode active material layer was 0.34 g/cm$^3$.

The electrode coated with the active material layer was installed in a heating press roll apparatus, similarly as in Example 1, and pressed under a line pressure of 100 kgf/cm, a distance between rolls of 60 μm in the first press, and 30 μm in the second presse, using the heating press roll heated at 140° C. to obtain a positive electrode having a bulk density of the electrode active material layer of 0.52 g/cm$^3$, and a thickness of 60 μm. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.603 mAh. Capacity per weight of the active material of the electrode was 140 F/g, and volume capacity was 73 F/cm$^3$.

Next, similar charging was carried out, and discharged down to 2.0 V under 100 mA, and then discharge capacity of 0.464 mAh was obtained. Ratio of discharge capacity under 100 mA, relative to discharge capacity under 1 mA was 77%.

In this case, 1 mA corresponds to 1.66 C. Capacity per weight of the positive electrode active material layer was 117 F/g, by similar calculation as in Example 1, and a product of a ratio of discharge capacity under a high current condition to discharge capacity under a low current condition was 89.9 which is below 115.

In addition, electric resistance was measured under an alternating current of 1 kHz, and found to be 0.53Ω.

Comparative Example 2

Preparation of Positive Electrode

An activated carbon was prepared under the same condition as in Example 1, except for mixing the carbonized product and KOH in a weight ratio of 1:2.6, in the activation method described in Example 1. Measurement was carried out on this activated carbon similarly as in Example 1, and it was found that mesopore volume V1 was 0.31 cc/g, micro-pore volume V2 was 0.93 cc/g, and BET specific surface area was 2048 m²/g. By using this activated carbon, a slurry-like active material layer was obtained by a similar method as in Example 1, which was coated on one side of aluminum foil having a thickness of 15 μm, and dried. Bulk density of the electrode active material layer was 0.33 g/cm³.

The electrode coated with the active material layer was installed in a heating press roll apparatus, similarly as in Example 1, and pressed under a line pressure of 110 kgf/cm, a distance between rolls of 60 μm in the first press, and 30 μm in the second press, using the heating press roll heated at 140° C. to obtain a positive electrode having a bulk density of the electrode active material layer of 0.53 g/cm³, and a thickness of 58 μm. The speed of the roll press was 5 m/min.

(Preparation of Negative Electrode)

Preparation of negative electrode was carried out similarly as in Example 1.

(Assembly and Performance Evaluation of an Electrical Storage Element)

Assembly of a lithium ion capacitor was carried out similarly as in Example 1.

The lithium ion capacitor prepared was charged to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.612 mAh. Capacity per weight of the active material of the electrode was 142 F/g, and volume capacity was 75 F/cm³.

Next, similar charging was carried out, and discharged down to 2.0 V under 100 mA, and then the discharge capacity of 0.477 mAh was obtained. Ratio of discharge capacity under 100 mA, relative to discharge capacity under 1 mA was 78%.

In this case, 1 mA corresponds to 1.63 C. Capacity per weight of the positive electrode active material layer was 118 F/g, by similar calculation as in Example 1, and a product of a ratio of discharge capacity under a high current condition to discharge capacity under a low current condition was 92.4 which is below 115.

In addition, electric resistance was measured under an alternating current of 1 kHz, and found to be 0.52Ω.

Comparative Example 3

Preparation of Positive Electrode

An activated carbon was prepared under the same condition as in Example 1, except for mixing the carbonized product and KOH in a weight ratio of 1:2.2, in the activation method described in Example 1. Measurement was carried out on this activated carbon similarly as in Example 1, and it was found that mesopore volume V1 was 0.75 cc/g, micro-pore volume V2 was 0.72 cc/g, and BET specific surface area was 1957 m²/g. By using this activated carbon, a slurry-like active material layer was obtained by a similar method as in Example 1, which was coated on one side of aluminum foil having a thickness of 15 μm, and dried. Bulk density of the electrode active material layer was 0.34 g/cm³.

The electrode coated with the active material layer was installed in a heating press roll apparatus, similarly as in Example 1, and was pressed under a line pressure of 100 kgf/cm, and a distance between rolls of 60 μm in the first press, and a distance between rolls of 30 μm in the second press, using a press roll in a room temperature state without heating, to obtain a positive electrode having a bulk density of the electrode active material layer of 0.51 g/cm³, and a thickness of 61 μm. The speed of the roll press was 5 m/min.

(Preparation of Negative Electrode)

Preparation of negative electrode was carried out similarly as in Example 1.

(Assembly and Performance Evaluation of an Electrical Storage Element)

Assembly of a lithium ion capacitor was carried out similarly as in Example 1.

The lithium ion capacitor prepared was charged to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.560 mAh. Capacity per weight of the active material of the electrode was 130 F/g, and volume capacity was 66 F/cm³.

Next, similar charging was carried out, and discharged down to 2.0 V under 100 mA, and then the discharge capacity of 0.471 mAh. Ratio of discharge capacity under 100 mA, relative to discharge capacity under 1 mA was 84%.

In this case, 1 mA corresponds to 1.79 C. Capacity per weight of the positive electrode active material layer was 108 F/g, by similar calculation as in Example 1, and a product of a ratio of discharge capacity under a high current condition to discharge capacity under a low current condition was 91.1 which is below 115.

In addition, electric resistance was measured under an alternating current of 1 kHz, and found to be 0.42Ω.

Comparative Example 4

Preparation of Positive Electrode

The electrode coated with the active material layer on the aluminum foil in Example 1, was pressed only one time under a line pressure of 120 kgf/cm, and a distance between rolls of 60 μm, to obtain a positive electrode having a bulk density of the electrode active material layer of 0.38 g/cm³, and a thickness of 82 μm, which had lower bulk density as compared with Example 1. The speed of the roll press was 5 m/min.

(Preparation of Negative Electrode)

Preparation of negative electrode was carried out similarly as in Example 1.

(Assembly and Performance Evaluation of Electrical Storage Element)

Assembly of a lithium ion capacitor was carried out similarly as in Example 1.

The lithium ion capacitor prepared was charged to 4.0 V under a current of 1 mA, and then subjected to constant current constant voltage charging, on which a constant voltage of 4.0 V was applied, for 2 hours, using a charge-discharge apparatus (ACD-01), manufactured by Aska Electronic Co., Ltd. Subsequently, it was discharged down to 2.0 V under a current of 1 mA. Discharge capacity was 0.694 mAh. Capacity per weight of the active material of the electrode was 161 F/g, and volume capacity was 61 F/cm³.

Next, similar charging was carried out, and discharged down to 2.0 V under 100 mA, and then the discharge capacity of 0.583 mAh was obtained. Ratio of discharge capacity under 100 mA, relative to discharge capacity under 1 mA was 84%, which was good.

In this case, 1 mA corresponds to 1.44 C. Capacity per weight of the positive electrode active material layer was 134 F/g, by similar calculation as in Example 1, and a product of a ratio of discharge capacity under a high current condition, relative to discharge capacity under a low current condition was 112.8 which is below 115.

In addition, electric resistance was measured under an alternating current of 1 kHz, and found to be 0.43Ω.

Comparative Example 5

Preparation of Positive Electrode

The electrode, coated with the active material layer on the aluminum foil in Example 1, was pressed only one time under a line pressure of 200 kgf/cm, and a distance between rolls of 0 μm, to obtain a positive electrode having a bulk density of the electrode active material layer of 0.42 g/cm$^3$, and a thickness of 74 μm, which had wrinkle at the electrode, and a part of peeling of the active material layer, therefore assembly of a lithium ion capacitor was impossible to carry out. Press was carried out at velocity of 5 m/min.

The above results are shown together in Table 1 below.

TABLE 1

|  | Micropore volume V2 (cc/g) | Mesopore volume V1 (cc/g) | Weight capacity of electrode active material at 1 mA (F/g) | Rate characteristics* (%) |
|---|---|---|---|---|
| Example 1 | 1.10 | 1.02 | 165 | 88 |
| Example 2 | 1.88 | 1.33 | 175 | 89 |
| Example 3 | 2.28 | 1.50 | 180 | 91 |
| Example 4 | 0.92 | 1.31 | 155 | 92 |
| Example 5 | 1.79 | 1.22 | 174 | 88 |
| Example 6 | 1.76 | 1.34 | 176 | 92 |
| Example 7 | Same as in Example 1 | Same as in Example 1 | 165 | 87 |
| Example 8 |  |  | 164 | 89 |
| Example 9 |  |  | 166 | 90 |
| Comparative Example 1 | 1.04 | 0.26 | 140 | 77 |
| Comparative Example 2 | 0.93 | 0.31 | 142 | 78 |
| Comparative Example 3 | 0.72 | 0.75 | 130 | 84 |
| Comparative Example 4 | Same as in Example 1 | Same as in Example 1 | 161 | 84 |
| Comparative Example 5 |  |  | Unmeasurable | Unmeasurable |

*Discharge capacity at 100 mA/discharge capacity at 1 mA

INDUSTRIAL APPLICABILITY

The electrical storage element using the negative electrode material for the electrical storage element of the present invention can be utilized suitably in a field of a hybrid drive system, where an internal combustion engine or a fuel cell, a motor and the electrical storage element are combined, in an automobile, and also in an assist application of instantaneous power peak.

REFERENCE SIGNS LIST 1 feed roll
2 guide
3 heating press roll
4 wind-up roll
5 hydraulic cylinder
6 positive electrode
7 positive electrode terminal
8 negative electrode terminal
9 outer casing
10 electrode body
11 positive electrode current collector
12 positive electrode active material layer
13 separator
14 negative electrode current collector
15 negative electrode active material layer
16 positive electrode
17 negative electrode

The invention claimed is:

1. A non-aqueous lithium-type electrical storage element, having:
an electrode body laminated with
a positive electrode having a positive electrode active material layer including a positive electrode active material, and a positive electrode current collector,
a separator, and
a negative electrode having a negative electrode active material layer including a negative electrode active material, and a negative electrode current collector;
a non-aqueous electrolytic solution including a lithium ion; and
an outer casing;
wherein said positive electrode active material comprises an active material having a BET specific surface area of 3051 m$^2$/g or more and less than or equal to 4500 m$^2$/g, and having an average particle size of 1 μm to 30 μm, in which mesopore volume V1 (cc/g) derived from a pore having a diameter of 20 Å to 500 Å, calculated by the BJH method, is $0.8 < V1 \leq 2.5$, and micro-pore volume V2 (cc/g) derived from a pore having a diameter of smaller than 20 Å, calculated by the MP method, is $1.0 < V2 \leq 3.0$; and said positive electrode active material layer has a bulk density of 0.40 g/cm$^3$ to 0.70 g/cm$^3$.

2. Said non-aqueous lithium-type electrical storage element according to claim 1, wherein said positive electrode active material is an activated carbon having a BET specific surface area of 3051 m$^2$/g to 4000 m$^2$/g.

3. Said non-aqueous lithium-type electrical storage element according to claim 1 or 2, wherein said negative electrode active material comprises a composite porous material, in which mesopore volume Vm1 (cc/g) derived from a pore having a diameter of 20 Å to 500 Å, calculated by the BJH method, is $0.01 \leq Vm1 \leq 0.20$, and micro-pore volume Vm2 (cc/g) derived from a pore of smaller than a diameter 20 Å calculated by the MP method, is $0.01 \leq Vm2 \leq 0.40$.

4. Said non-aqueous lithium-type electrical storage element according to claim 1 or 2, wherein said negative electrode active material comprises a hard carbon material, in which mesopore volume Vm1 (cc/g) derived from a pore having a diameter of 20 Å to 500 Å, calculated by the BJH method, is $0.001 \leq Vm1 \leq 0.01$, and micro-pore volume Vm2 (cc/g) derived from a pore having a diameter of smaller than 20 Å, calculated by the MP method, is $0.001 \leq Vm2 \leq 0.01$.

5. Said non-aqueous lithium-type electrical storage element according to claim 1 or 2, wherein the product of capacity per weight of said positive electrode active material layer, and ratio of discharge capacity under high current condition to discharge capacity under low current condition, is 115 or more.

6. An electrode for an electrical storage element, which comprises an active material, having a BET specific surface area of 3051 m$^2$/g or more and less than or equal to 4500 m$^2$/g, and having an average particle size of 1 μm to 30 μm, in which mesopore volume V1 (cc/g) derived from a pore having a diameter of 20 Å to 500 Å, calculated by the BJH method, is $0.8<V1\leq2.5$, and micro-pore volume V2 (cc/g) derived from a pore having a diameter of smaller than 20 Å, calculated by the MP method, is $1.0<V2\leq3.0$; and wherein bulk density of an active material layer, which comprises said active material, is 0.40 g/cm$^3$ to 0.70 g/cm$^3$.

\* \* \* \* \*